Patented June 21, 1927.

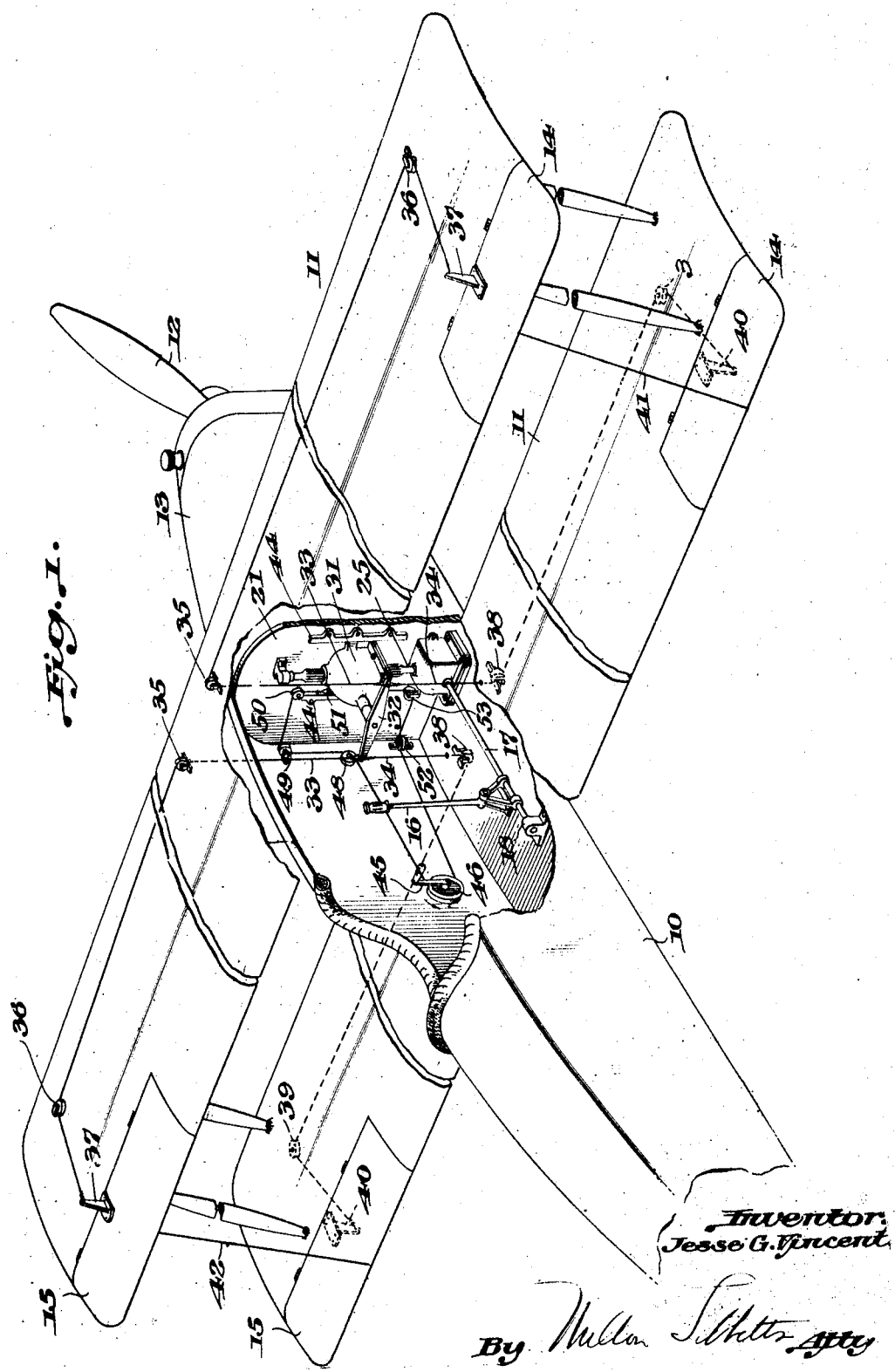

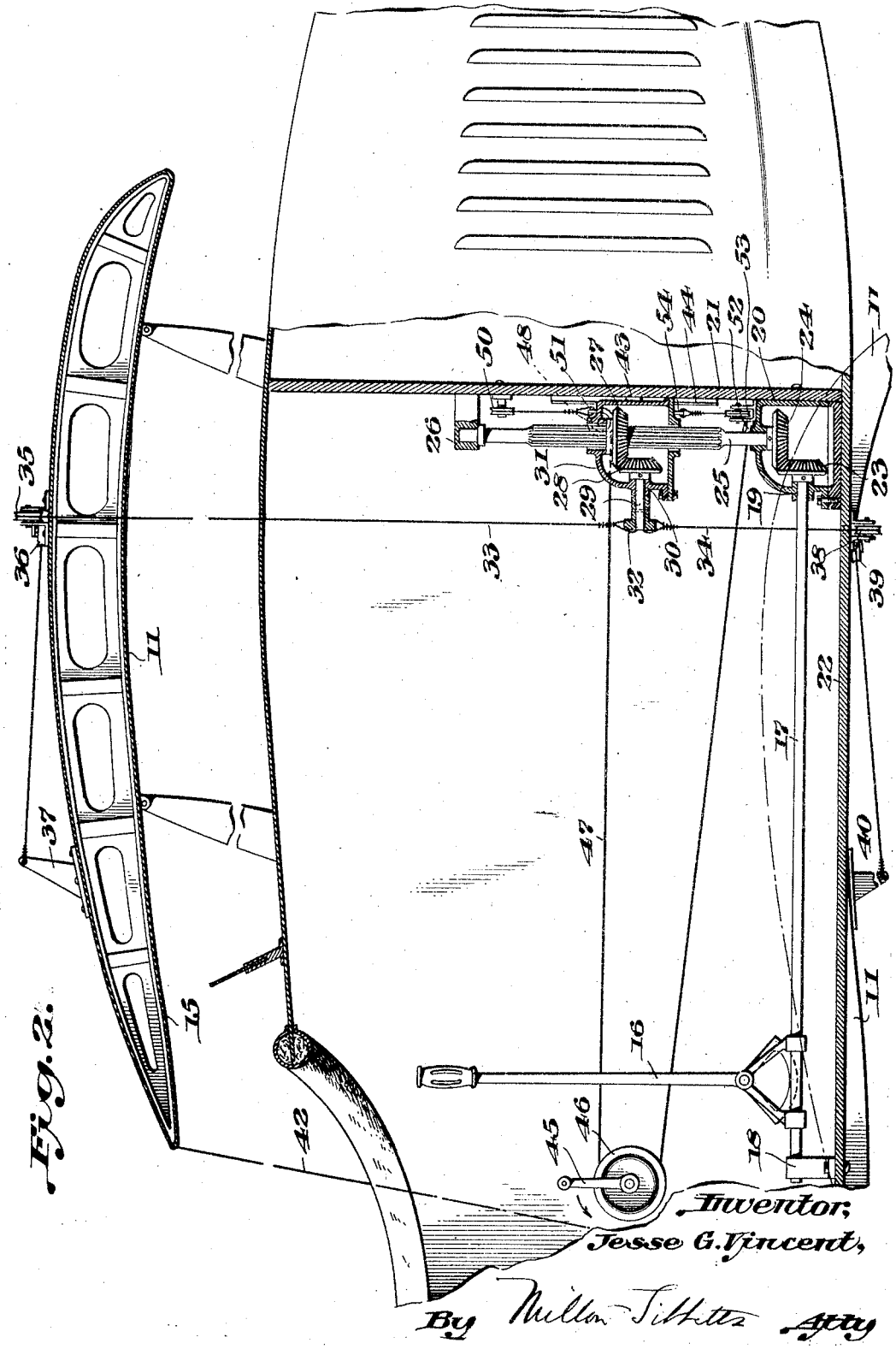

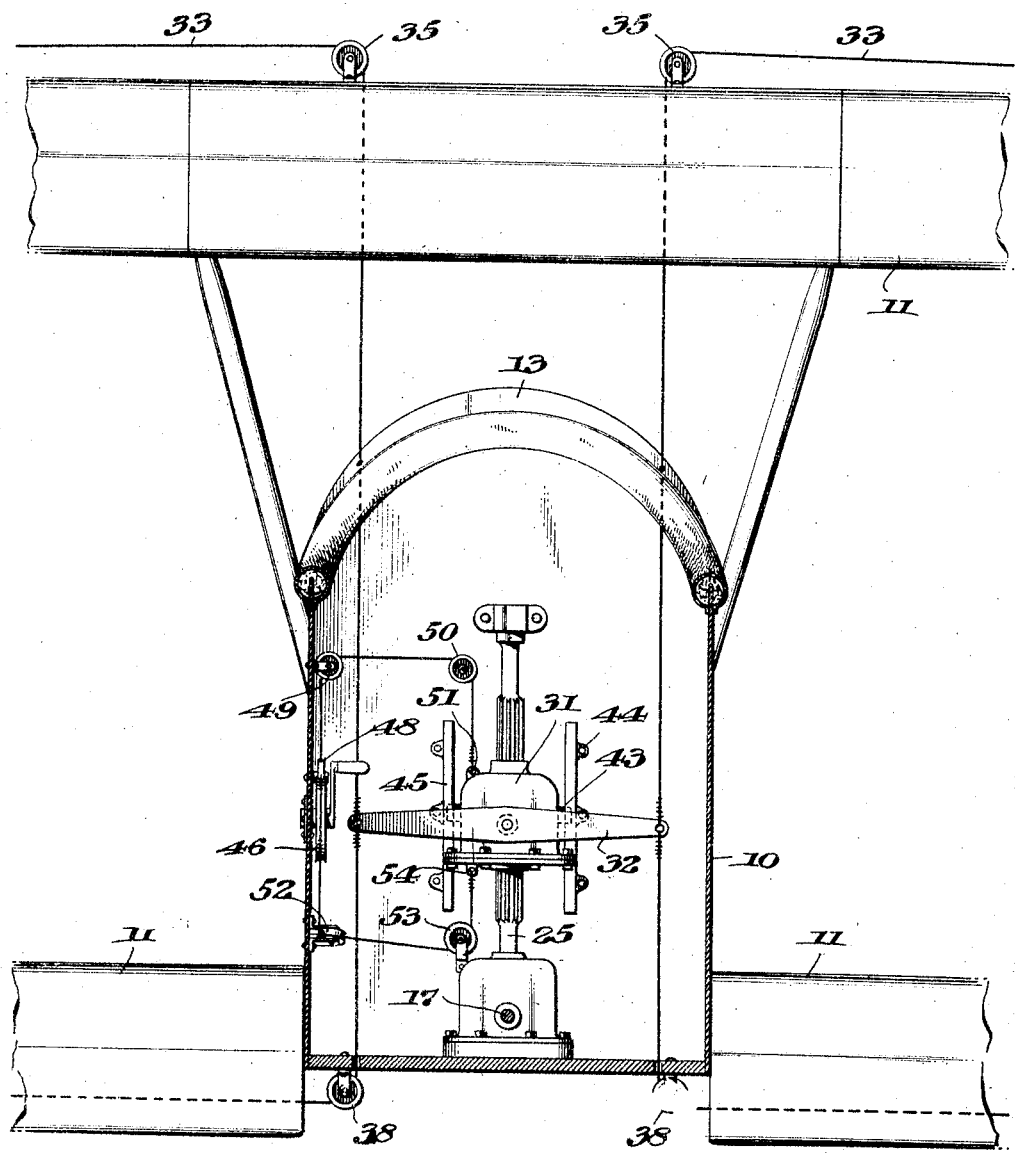

1,632,862

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

AIRPLANE.

Application filed May 21, 1921. Serial No. 471,309.

This invention relates to airplanes and particularly to control mechanism therefor.

One of the greatest difficulties experienced by airplane operators is that of landing, and this is due largely to the fact that the speed of the airplane cannot be reduced quickly enough when the machine is landing.

With this difficulty in mind, the salient object of this invention is to effectively and quickly reduce the speed of an airplane when the machine is landing.

Another object of the invention is to utilize the ailerons of an airplane as a means for controlling the speed of the plane.

Further objects of the invention will appear from the following specification taken in connection with the drawings, which form a part of this application, and in which;

Figure 1 is a perspective view, partly broken away, of an airplane having my improved controlling means embodied therein.

Figure 2 is a vertical sectional view taken transversely of the wings and illustrating the aileron control mechanism; and Figure 3 is a vertical sectional view taken through the fuselage and illustrating the operating means for the aileron control mechanism in elevation.

The airplane illustrated in the drawings comprises a fuselage or body 10, wings 11, a propeller 12, driven by the motor (not shown) but enclosed within the cowl 13.

Each of the wings 11 has pivoted thereto for vertical movement adjacent its opposite ends, ailerons 14 and 15.

The usual function of the ailerons of an airplane is to control the angle of the wings or, in other words, to tilt the plane at any desired angle about the fuselage as an axis. In order to accomplish this, means is provided for simultaneously tilting the ailerons at one side of the fuselage in one direction, while simultaneously tilting the other ailerons at the other side of the fuselage, or at the other ends of the wings, in the opposite direction.

In the present instance, this is accomplished by means of a control stick 16 carried by a shaft 17, rotatably mounted at one end in a bearing 18 and at its opposite end in a bearing 19, the latter bearing being formed in a casing 20 secured to a vertical frame member 21 of the fuselage and to a horizontal frame member or flooring 22. When the control stick 16 is moved laterally, the shaft 17 is rotated in its bearings and this movement of the shaft is communicated through inter-meshing bevel gears 23 and 24 to a vertical shaft 25, mounted at one end in a bearing in the casing 20, and at its opposite end in a bearing bracket 26 secured to the vertical frame 21.

The shaft 25 has splined thereto for vertical movement thereon a bevel gear 27 which meshes with the bevel gear 28 carried by shaft 29 pivoted in a bearing 30 formed in a casing 31, which also encloses the gear 27 and through which the shaft extends.

The shaft 29 forms a pivot for a lever 32 and this lever has secured to its opposite ends wires or cables 33 and 34.

The cables 33 extend vertically from the lever over idler pulleys 35 and thence laterally and around pulleys 36 to posts 37, the pulleys being carried by wings and the posts being secured to and extending vertically upward from the ailerons 14 and 15.

The wires 34 extend downwardly from the ends of the lever 32 and around idler pulleys 38 and laterally therefrom and around pulleys 39 to downwardly extending vertical posts 40, secured to the ailerons 14 and 15 on the lower plane. The ailerons 14, 14 are connected by a wire 41 and the ailerons 15, 15 are connected by a wire 42 so that the corresponding ailerons will move together.

From the above description it will be seen that as the control stick 16 is moved laterally, the lever 32 will be rotated on its pivot and will tilt the ailerons at one side of the fuselage, or at one end of the wings, in one direction and at the same time will tilt the ailerons at the opposite end of the wings in the opposite direction.

The construction just described is the usual one and the aileron control by the control stick 16 is utilized to tilt the plane at any desired angle about the fuselage as an axis. The present invention, however, comprises means for utilizing the ailerons for performing a brake function during landing and this is accomplished in the manner hereinafter described.

As shown particularly in Figures 1 and 3, the casing or support 31 is mounted for bodily vertical movement, this casing being provided with laterally extending lugs 43 positioned in guide-ways formed by angular vertically disposed guide strips 44 secured to the frame member 21.

In order to move the casing or support 31 vertically, I have provided a crank 45 having secured thereto a pulley or, if desired, a sprocket 46 around which extends a cable, or sprocket chain, if preferred, 47, one end of this cable extending around idler pulleys 48, 49 and 50 and being secured as shown at 51 to the casing 31 and opposite end extending around pulleys 52 and 53 and being secured as shown at 54 to the bottom of the casing 31. It will be understood that in case a grooved pulley is used for the member 46, suitable means will be provided for preventing the slipping of the cable 47 as the pulley is rotated by the crank 45.

The control mechanism just described operates as follows:

When the plane is landing and the operator desires to retard the speed of the plane, the crank 45 will be rotated in the direction of the arrow, thereby tilting the ailerons 14 and 15 on each wing downwardly. This, of course, increases the wind resistance by presenting a greater surface for the wind pressure, and in this manner retards the progress or brakes the speed of the plane.

From the above specification it will be seen that means has been provided for tilting the ailerons in the usual manner, in order to control the angular position of the wings, and further that means has been provided for simultaneously tilting all of the ailerons in the same direction to utilize the ailerons for performing a brake function.

Although I have, in the above specification, described one specific embodiment of the invention, it will be understood that the invention is capable of modification, and that changes in the construction and in the arrangement of the various cooperating parts may be made without departing from the spirit or scope of the invention as expressed in the following claims.

Having described my invention, what I claim and desire to secure by Letters Patent is:

1. In an airplane, ailerons, a slidably mounted supporting member, a lever pivoted in said member and connected to said ailerons, means having a fixed pivot for swinging said lever on its pivot, and means for moving said support and lever bodily.

2. In an airplane having wings, ailerons pivoted to said wings at opposite sides of the center of the airplane, a control stick, a control unit, operative connections between said stick and said unit and a connection between said unit and said ailerons whereby the movement of said stick will tilt the ailerons at the opposite ends of the wings in opposite directions, a second control member independent of said first control member and operative connections between said second control member and the aileron control unit whereby movement of said second control means will cause all of the ailerons to tilt simultaneously in the same direction to provide a braking effect for the airplane while said stick remains stationary.

3. In an airplane having ailerons pivoted thereto, a control stick, a pivoted lever, connections between said lever and said ailerons, connections between said control stick and said lever for swinging the lever on its pivot, a second control member and operative connections between said second control member and said lever for moving said lever bodily while said control stick remains stationary.

4. In an airplane having ailerons pivoted thereto, a supporting member, a lever pivoted on said supporting member and operatively connected to said ailerons, hand operated means for tilting said lever on its pivot, and means for vertically moving said support and lever while said hand operated means remains stationary.

5. In an airplane having ailerons pivoted thereto, a horizontally disposed shaft, means for rotating said shaft, a vertically disposed shaft, operative connections between said shafts, a support vertically movable on said second shaft, a lever pivoted in said support, operative connections between said lever and said shaft, means for connecting said lever to said ailerons, and means for vertically moving said support.

6. In an airplane having ailerons pivoted thereto, a vertical frame member, a vertically movable support, means carried by said frame member for guiding said support in its vertical movement, a lever pivoted in said support, operative connections between the ends of said lever and said ailerons, means for tilting said lever, and means for moving said support and lever vertically.

7. In an airplane having ailerons pivoted thereto, a lever, operative connections between the ends of the lever and the ailerons, a pivot shaft for said lever, a manually rotatable shaft parallel to said pivot shaft, operative connections causing said shafts to rotate in the same directions and means to vary the distance between said shafts.

8. In an airplane having ailerons pivoted thereto, a lever, operative connections between the ends of the lever and the ailerons, a horizontal shaft carrying said lever and mounted in a slidable housing, a vertical shaft, a splined bevel gear thereon mounted in said housing and meshing with a corresponding gear on said lever shaft, a horizontal shaft, manually rotatable, having operative connection with said vertical shaft and means for moving said housing.

9. In an airplane having ailerons pivoted thereto, a horizontally disposed shaft, means for rotating said shaft, a vertically disposed shaft, operative connections between said shafts, a gear splined to said vertical shaft and carried in a slidable housing, a lever having a pivot shaft mounted in said housing, a gear on said pivot shaft meshing with said splined gear, means for connecting said lever to said ailerons, and means for vertically moving said housing.

In testimony whereof I affix my signature.

JESSE G. VINCENT.